US005648168A

United States Patent [19]

Hatch et al.

[11] Patent Number: 5,648,168

[45] Date of Patent: Jul. 15, 1997

[54] DUPLEX COATING FOR CORONA ELECTRODES

[75] Inventors: Russell Bruce Hatch; Keith Edward Bowen, both of Swindon, England

[73] Assignee: Praxair S.T. Technology, Inc., Danbury, Conn.

[21] Appl. No.: 588,475

[22] Filed: Jan. 18, 1996

Related U.S. Application Data

[63] Continuation of Ser. No. 226,425, Apr. 12, 1994, abandoned, which is a continuation of Ser. No. 885,820, May 20, 1992, abandoned.

[51] Int. Cl.$^6$ .................................................... B32B 09/00

[52] U.S. Cl. .......................... 428/379; 204/623; 204/668; 204/669; 428/688

[58] Field of Search .................................. 428/379, 618, 428/688; 204/164, 280, 224 M, 623, 668, 669, 670; 250/326; 219/69.15, 383; 264/483

[56] References Cited

U.S. PATENT DOCUMENTS

| | | | |
|---|---|---|---|
| 3,789,278 | 1/1974 | Bingham | 250/326 |
| 4,145,386 | 3/1979 | Rosenthal | 264/22 |
| 4,334,144 | 6/1982 | Ferrarini | 219/383 |
| 4,740,666 | 4/1988 | Tomalin | 428/618 |
| 4,908,165 | 3/1990 | Kramer et al. | 264/22 |
| 5,401,368 | 3/1995 | Ford | 204/164 |

*Primary Examiner*—Patrick Ryan
*Assistant Examiner*—Patrick Jewik
*Attorney, Agent, or Firm*—Cornelius F. O'Brien

[57] ABSTRACT

A corona electrode, such as a roller electrode, having an outer dielectric layer and an undercoat of a copper layer that permits the electrode to operate at a lower temperature for a specific power input over a similar electrode without the copper undercoat.

8 Claims, No Drawings

DUPLEX COATING FOR CORONA ELECTRODES

This application is a continuation of prior U.S. application Ser. No. 08/226,425 filing date Apr. 12, 1994 now abandoned which is a continuation of application Ser. No. 07/885,820 filing date May 20, 1992 now abandoned.

FIELD OF THE INVENTION

The invention relates to a duplex coated corona electrode that has an under coat of copper and a top coat of a dielectric, such as alumina, and in which said electrode can be used in high power and/or speed operations at reduced temperatures.

BACKGROUND OF THE INVENTION

It is well known that adhesion to the surfaces of materials is improved by the exposure to a corona discharge. Thus corona treatment has been used to treat the surfaces of thermoplastic materials to improve their adhesion to printing inks, paints, coatings and bodies of other materials.

Many methods for the continuous corona discharge surface treatment of thermoplastic materials have been employed wherein the material continuum is passed through an air gap between stationary and roller electrodes. The stationary electrode is typically a bar or cluster of bars and the relatively large roller electrode is coated with a dielectric coating. A high voltage, of the order of 20 KV at 10 kHz, is typically impressed across the electrodes. A corona arc discharge is developed in the gap and produces surface treatment of the thermoplastic material continuum which results in the promotion of excellent adhesion properties on the surface of the treated continuum. However, the provision and maintenance of such dielectric coatings on such roller electrodes which support the material to be treated present a number of problems which result in operational difficulties.

The dielectric roller coating is a major factor in good performance of the corona treatment process. Several qualities are sought for the reasons indicated below.

1. The capacitance per unit area must be high and this requires a high £/t ratio where £ is the dielectric constant and t is the thickness. Corona power is directly proportional to capacitance per unit area.

2. The buffer must have a high dielectric strength (i.e., volts/mil=$E_{max}$; an electric field) since this surface may experience the full applied electrode voltage and large working voltages correspond to large corona powers.

3. The roller coating should be capable of dissipating the heat generated, unaffected by ozone and oxides of nitrogen, and mechanically tough.

Catastrophic failure of a roller can result in costly production losses. Replacement of a roller and shipment of the roller out of a plant for recoating is expensive. In some applications, the dielectric coating that is generally deposited on the roller electrode can instead be deposited on the stationary electrode. This reduces the more expensive coating of the roller electrode and the cost associated with the replacements of the roller. In either case the temperature of the surface of the dielectric coated electrode during high power levels of operations (exceeding 4 or 5 kilowatts per square meter) could exceed 100° C. or even approach or exceed the melting point of the material being treated.

It is an object of the present invention to provide a duplex coated corona electrode that has a reduced stabilized operating temperature when used at high power levels of operations.

It is another object of the present invention to provide a duplex coating for a corona roller electrode that will enable the electrode to operate at a reduced temperature for higher power levels and higher speeds than single coated roller electrodes.

SUMMARY OF THE INVENTION

The invention relates to a corona discharge electrode comprising a substrate coated with an under coat of copper and a top coat of a dielectric refractory metal oxide. The preferred thickness of the copper layer can be between about 0.025 and 1.0 millimeters, and more preferably between about 0.25 and 0.6 millimeters. In the preferred embodiment, the corona electrode would be the corona roller electrode. The substrate of the electrode may be comprised of a wide variety of metals such as low carbon steel or an aluminum alloy. The substrate could also be made of carbon fibers, glass fibers or other composite materials.

The outer refractory layer may comprise any one or more of a wide variety of refractory inorganic metal compounds which have dielectric properties, such as refractory metal oxides, nitrides and borides which have long been employed in the art to impart high temperature strength, wear resistance, shock resistance and other such properties when applied as protective or shielding coatings. Such dielectric coatings normally possess good high thermal conductivity properties which are desired to prevent the buildup of heat in the electrode and also possess high resistivity, dielectric strength and dielectric constant plus low loss factors. The preferred outer layer would be alumina, alumina and cobalt mixture or the like. The thickness of the outer layer could be from 0.25 to 5.0 millimeters and preferably from 0.5 to 1.2 millimeters.

Preferably, a sealant could be used to seal the outer coating and fill any voids in the coating. Suitable sealants would be an epoxy sealant such as UCAR 100 sealant which is obtained from Union Carbide Corporation, Danbury, Connecticut. UCAR 100 is a trademark of Union Carbide Corporation for a thermosetting epoxy resin. Other suitable sealants are Dow Corning 994 Varnish which is a silicone-based electrical varnish and Xylok 210 which is a phenolaralkyl resin manufactured by Advanced Resins Ltd. of England. The sealant can effectively seal fine microporosity that may be developed during the coating process and therefore provide a finish with good resistance to contamination that may be encountered during use.

A corona apparatus generally comprises a pair of electrodes, one of which is coated with a dielectric material and other is made of metal. The electrodes are connected to an electric generator operating at a voltage and frequency such as to produce a discharge distributed along the entire length of the electrodes at their mutually facing areas. The materials to be treated, which may be sheets or foils of plastics and other materials, are inserted between the two electrodes in the area where the discharge is to occur. Since nearly all of the electric power supplied to the electrodes is converted into heat which is distributed between the surfaces of the electrodes, the temperature of the electrodes increases. A reduction of the residence time of the material being treated under the discharge, as required for a high production rate or output, requires an increase of the discharge density over the electrodes in order to maintain constant the energy needed for the required degree of surface treatment. This results in an increase of the thermal energy dispensed to the electrodes and a consequent increase of temperature, with an attendant deterioration of the dielectric properties of the insulated electrode. An increase in the temperature of a corona roller could also damage a thermoplastic film being treated on the roller.

In the subject invention, a copper layer is deposited on one of the electrode substrates and then a dielectric coating, such as an aluminum alloy, e.g. alumina, is deposited over the copper layer. The copper layer has been found to reduce the final stabilized operating temperature of the electrode thus allowing for higher operating powers for the corona treatment. As the power is increased, the residence time of the material being treated can be reduced thus increasing the production rate of the corona process. As stated above, a corona roller operating at a low temperature will not damage the film being treated. A roller operating at a lower temperature will also enable a sealant, when used, to function properly.

EXAMPLE

A corona roller having either a steel or carbon fiber substrate was coated with a 0.25 mm layer of copper and a top layer of alumina. The duplex coated corona roller electrode was used in a corona apparatus and using the same power input the temperature of each corona roller electrode was measured after the same time period. The data obtained are shown in the Table.

TABLE

| Sample | Corona Roller | Inner Coat | Top Coat | Temperature |
|---|---|---|---|---|
| A | Steel Substrate | none | alumina | 49° C. |
| B | Steel Substrate | copper | alumina | 44° C. |
| C | Carbon Fiber substrate | copper | alumina | 35.5° C. |

As shown in the Table, the inner coat of copper lowered the temperature of the Sample B corona roller electrode over a similar corona roller electrode, Sample A, that did not have the inner coat of copper. The data also show that a corona roller electrode comprising a carbon fiber substrate with a copper inner layer and alumina outer layer can operate at a reduced temperature for a specific power level than a similiar corona roller electrode that has a steel substrate. As evidenced from the data, the corona roller electrode of this invention can be operated at higher power levels at lower temperatures thereby increasing the output rate for treating film materials.

Although the preferred embodiment is to have the duplex layer on the corona roller electrode, it is also within the scope of this invention to have the duplex layer on the stationary electrode. Although specific embodiments of this invention have been described, it should be understood that various modifications may be made without departing from the spirit of this invention.

What is claimed:

1. A corona apparatus comprising a stationary electrode spaced apart from a roller electrode which defines an air gap between said electrodes; means for inducing a voltage across the electrodes, so that a corona are discharge can be developed in the gap between the stationary electrode and the roller electrode; the improvement wherein the stationary electrode or roller electrode comprises a substrate selected from the group consisting of steel, carbon fibers, glass fibers and aluminum alloys and said substrate coated with an inner layer of copper and a top layer of dielectric inorganic metal compound.

2. The corona apparatus of claim 1 wherein the layer of copper is from 0.025 to 1.0 mm thick.

3. The corona apparatus of claim 1 wherein the copper layer is from 0.25 to 0.6 mm thick.

4. The corona apparatus of claim 1 wherein the substrate comprises carbon fibers.

5. The corona apparatus of claim 1 wherein the substrate comprises glass fibers.

6. The corona apparatus of claim 1 wherein the roller substrate of the roller electrode is steel and the top layer is alumina.

7. The corona apparatus of claim 1 wherein the top layer is coated with a sealant.

8. The corona apparatus of claim 7 wherein the sealant is an epoxy or a silicate sealant.

* * * * *